(12) United States Patent
Hunold et al.

(10) Patent No.: US 8,701,515 B2
(45) Date of Patent: Apr. 22, 2014

(54) DRIVE ASSEMBLY FOR A MOTOR VEHICLE, COMPRISING A POWER TAKE-OFF CLUTCH

(75) Inventors: Bernard Hunold, Friedrichshafen (DE); Eckhardt Lubke, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 261 days.

(21) Appl. No.: 13/265,385

(22) PCT Filed: May 7, 2010

(86) PCT No.: PCT/EP2010/056244
§ 371 (c)(1),
(2), (4) Date: Oct. 20, 2011

(87) PCT Pub. No.: WO2010/130648
PCT Pub. Date: Nov. 18, 2010

(65) Prior Publication Data
US 2012/0042743 A1    Feb. 23, 2012

(30) Foreign Application Priority Data
May 14, 2009    (DE) .......................... 10 2009 003 107

(51) Int. Cl.
*F16H 3/08*    (2006.01)
*F16H 59/00*    (2006.01)

(52) U.S. Cl.
USPC .............................................. 74/330; 74/335

(58) Field of Classification Search
USPC ........... 74/335, 339, 330, 331, 340, 329, 661,
74/664, 721, 745, 15.86, 15.2, 15.4, 15.6,
74/15.66, 325, 333
See application file for complete search history.

(56) References Cited

U.S. PATENT DOCUMENTS

| | | | |
|---|---|---|---|
| 3,774,460 A | 11/1973 | Browning et al. | |
| 4,191,072 A | 3/1980 | Ehrlinger et al. | |
| 4,245,514 A * | 1/1981 | Miyahara et al. | ............ 74/15.84 |
| 4,296,644 A * | 10/1981 | Sada et al. | .................. 74/606 R |
| 4,727,764 A * | 3/1988 | Klaue | .............................. 74/331 |
| 6,460,425 B1 * | 10/2002 | Bowen | ............................ 74/331 |
| 6,676,563 B2 * | 1/2004 | Katou | ............................ 477/78 |

(Continued)

FOREIGN PATENT DOCUMENTS

| DE | 2 325 699 | 1/1974 |
|---|---|---|
| DE | 25 56 669 B1 | 3/1978 |

(Continued)

*Primary Examiner* — Troy Chambers
*Assistant Examiner* — Jude Agendia
(74) *Attorney, Agent, or Firm* — Davis & Bujold, PLLC; Michael J. Bujold

(57) ABSTRACT

A drive assembly for a motor vehicle with a clutch device on the input side. The drive assembly includes a transmission having input and output shafts, loose and fixed gearwheels, shifting devices for coupling the loose gearwheels to the transmission shafts, a power take-off (PTO) gearwheel that can be driven by the input of the clutch device, and a PTO clutch for engaging the PTO gearwheel in the torque flow. The PTO clutch is arranged in the torque flow after and axially adjacent a starting and shifting clutch. The clutch device comprises the starting and shifting clutch, the PTO clutch and two actuators. The starting and shifting clutch is a friction clutch and the PTO clutch is a claw clutch. The two clutches have a clutch cover and a common actuator housing, and the coupling device of the PTO clutch is arranged radially outside the clutch cover.

19 Claims, 2 Drawing Sheets

(56) References Cited

U.S. PATENT DOCUMENTS

| | | | |
|---|---|---|---|
| 6,814,686 B2 * | 11/2004 | Carriere et al. | 477/6 |
| 6,916,268 B2 * | 7/2005 | Ohkubo | 475/302 |
| 6,945,893 B2 * | 9/2005 | Grillo et al. | 475/5 |
| 7,204,166 B2 * | 4/2007 | Gochenour | 74/340 |
| 7,621,839 B2 * | 11/2009 | Jackson | 475/214 |
| 7,891,263 B2 * | 2/2011 | Mowbray et al. | 74/340 |
| 8,051,732 B2 * | 11/2011 | Gitt | 74/331 |
| 8,161,834 B2 * | 4/2012 | Steffens | 74/15.84 |
| 8,419,582 B2 * | 4/2013 | Renner | 475/221 |
| 8,528,433 B2 * | 9/2013 | Hunold et al. | 74/330 |
| 2002/0007698 A1 * | 1/2002 | Matsufuji | 74/745 |
| 2004/0025612 A1 | 2/2004 | Ahnert et al. | |
| 2006/0248971 A1 * | 11/2006 | Inoue et al. | 74/335 |
| 2008/0254932 A1 | 10/2008 | Heinzelmann | |
| 2009/0107289 A1 | 4/2009 | Borntrager | |
| 2010/0199792 A1 * | 8/2010 | Werner et al. | 74/330 |
| 2010/0242638 A1 | 9/2010 | Steffens | |
| 2012/0103116 A1 * | 5/2012 | Hunold et al. | 74/330 |

FOREIGN PATENT DOCUMENTS

| | | |
|---|---|---|
| DE | 101 52 859 A1 | 5/2003 |
| DE | 101 53 442 A1 | 5/2003 |
| DE | 10 2005 046 894 A1 | 5/2007 |
| DE | 10 2006 024 370 A1 | 12/2007 |
| DE | 10 2007 053 674 A1 | 1/2009 |
| DE | 10 2008 001 200 A1 | 10/2009 |
| EP | 1 921 349 A1 | 5/2008 |
| WO | 01/88409 A2 | 11/2001 |
| WO | 03/085287 A2 | 10/2003 |
| WO | 2007/134943 A1 | 11/2007 |
| WO | 2009/127473 A1 | 10/2009 |

* cited by examiner

DRIVE ASSEMBLY FOR A MOTOR VEHICLE, COMPRISING A POWER TAKE-OFF CLUTCH

This application is a National Stage completion of PCT/EP2010/056244 filed May 7, 2010, which claims priority from German patent application serial no. 10 2009 003 107.3 filed May 14, 2009.

FIELD OF THE INVENTION

The invention concerns a drive assembly for a motor vehicle, with a clutch device on the input side, with a transmission having a transmission input shaft and a transmission output shaft, with loose and fixed gears arranged on transmission shafts and forming transmission gears, with shifting devices for coupling the loose gears to at least one of the transmission shafts as necessary, with a power take-off gear that can be driven from the input side of the clutch device, and with a power take-off clutch for engaging the power take-off gear in the torque flow, the power take-off clutch being arranged in the torque flow downstream from and axially adjacent to a starting and shifting clutch.

BACKGROUND OF THE INVENTION

Apart from a starting and shifting clutch for driving operation, conventional drive assemblies for motor vehicles can have a power take-off by means of which working elements can be driven, which have no part in propelling the motor vehicle. For example, such a power take-off comprises a three-wheel gearset that can be driven from the input side of the starting and shifting clutch, and on its output side can drive a power take-off shaft. So that this power take-off shaft does not keep rotating whenever the drive motor is running, a shiftable power take-off clutch is usually provided, which is arranged radially outside the housing of the starting and shifting clutch and also radially outside the transmission. Such a drive assembly with a frictional staring and shifting clutch is known for example from DE 101 52 859 A1, while DE 26 56 669 C2 discloses a drive assembly with a hydrodynamic torque-converter having a bridging clutch and a frictional power take-off clutch.

The disadvantage of these known drive assemblies is that the arrangement of the frictional power take-off clutch radially on the outside takes up a comparatively large amount of fitting space. An improved design is shown by the transmission with a power take-off described in DE 10 2007 053 674 A1, in which the starting and shifting clutch is frictional and the power take-off clutch is a non-synchronized claw clutch. In this case the claw clutch is arranged in the torque flow downstream from the starting and shifting clutch and can be driven by the output side of the latter. Specifically, for this purpose the claw clutch is disposed axially between the starting and shifting clutch and the drive transmission, and radially on the inside in the area of a transmission input shaft, the transmission input shaft being connected to the output side of the starting and shifting clutch.

Although this drive assembly according to DE 10 2007 053 674 A1 has some advantages compared with the drive assemblies according to DE 101 52 859 A1 and DE 26 56 669 C2 in respect of the fitting space required radially on the outside, there is still room for technical improvements. Thus, the power take-off clutch together with the gearwheels of the power take-off are accommodated in a separate, so-termed adaptor housing, but this disadvantageously increases the overall weight of the drive assembly. When the power take-off is to be driven from the input side of the starting and shifting clutch, a second embodiment of DE 10 2007 053 674 A1 provides that in addition to the power take-off clutch described, a so-termed independence claw is provided, by means of which the gearwheel on the input side of the power take-off gearset can be connected to the input side of the starting and shifting clutch. Although this independence claw is arranged in the area of an input housing that accommodates the starting and shifting clutch, but within it, it is axially remote from the starting and shifting clutch and radially close to the transmission input shaft.

SUMMARY OF THE INVENTION

Against this background the purpose of the present invention is to improve a drive assembly in such manner that the radial and axial fitting space needed for the drive assembly is reduced compared with known drive assemblies. Furthermore it should be possible to be able to transmit comparatively high torques via the power take-off clutch and to keep the fitting space for the actuators of the starting and shifting clutch and the power take-off clutch as small as possible.

The invention is based on recognition that the set objectives can be achieved by structurally combining the starting and shifting clutch and the power take-off clutch as a dual clutch, with the starting and shifting clutch designed as a friction clutch and the power take-off clutch as a claw clutch.

Accordingly, the invention begins from a drive assembly for a motor vehicle, with a clutch device on the input side, with a transmission having a transmission input shaft and a transmission output shaft, with loose and fixed gearwheels that form transmission gears and are arranged on transmission shafts, with shifting devices for coupling the loose gearwheels in a rotationally fixed manner to at least one of the transmission shafts as necessary, with a power take-off gearwheel that can be driven from the input side of the clutch device, and with a power take-off clutch for engaging the power take-off gearwheel in the torque flow, the power take-off clutch being positioned axially close to the starting and shifting clutch.

To achieve the set objective it is also provided that the clutch device is designed as a dual clutch device, which comprises the starting and shifting clutch, the power take-off clutch and two clutch actuators respectively associated with the two clutches, that the starting and shifting clutch is designed as a friction clutch and the power take-off clutch as a claw clutch, that the two clutches have a common clutch cover and a common actuator housing, and that the coupling means of the power take-off clutch are arranged radially on the outside in the area of the clutch cover.

Owing to the axially and radially closely adjacent arrangement of the coupling means of the starting and shifting clutch and the power take-off clutch, their actuators can be arranged radially and axially nested in one another, whereby an axially very short dual clutch assembly is obtained. Furthermore, in this design the claw shifting device of the power take-off clutch can be positioned radially very far on the outside, so that comparatively high torques can be transmitted by this claw clutch. Moreover, the arrangement of the teeth of the claw clutch on as large as possible an effective diameter is advantageous in relation to low self-locking forces in the case of beveled claw teeth. Finally, thanks to the arrangement of the power take-off clutch in the space radially inside the starting and shifting clutch, the housing of the transmission or an adaptor housing for the gearset of the power take-off, if one is needed, can be kept very short.

Thus, according to a particular design feature of the drive assembly according to the invention, it is provided that the power take-off clutch is arranged radially and axially within the fitting space of an axial extension of a pressure plate of the starting and shifting clutch.

Another design form provides that the starting and shifting clutch is connected on its input side to the clutch cover and on its output side to the transmission input shaft.

A further design feature is that the power take-off clutch is also connected on its input side to the clutch cover and on its output side to a hollow shaft, this hollow shaft being mounted to rotate on the transmission input shaft, and such that the power take-off gearwheel is fixed to or formed on the hollow shaft. In a conventional manner the power take-off gearwheel meshes with a further gearwheel of the power take-off arrangement which, for its part, drives a gearwheel fixed on a power take-off shaft.

In a further design of the drive assembly it is provided that the starting and shifting clutch and the power take-off clutch each comprise a torsion fluctuation damper by means of which the rotation fluctuations of the crankshaft of an internal combustion engine that powers the drive assembly are damped.

Furthermore, in this connection it is provided that the torsion fluctuation damper of the power take-off clutch is connected to a sleeve arranged radially on the inside, which is connected in a rotationally fixed manner to the hollow shaft carrying the output gearwheel, that the torsion fluctuation damper of the power take-off clutch comprises at least one springy-elastic element, and that the torsion fluctuation damper of the power take-off clutch is connected radially on the outside to a driving disk which has radial gearteeth in the area of its radial end.

Moreover, a further design of the invention provides that the starting and shifting clutch comprises a cup spring which is fixed to the clutch cover and can be actuated by a control element of an actuator. The starting and shifting clutch can be for example, a friction clutch which is closed in the non-actuated condition.

Accordingly, the starting and shifting clutch comprises the already-mentioned pressure plate, which in the non-actuated condition of this clutch is acted upon by the cup spring with a closing force. As a particular design feature the pressure plate has radial openings, through which annular segments project radially inward with some play. These annular segments are arranged on the radially inner side of the clutch cover and are connected thereto in a rotationally fixed manner. Furthermore, these annular segments have radial gearteeth at their axial end directed toward the power take-off clutch and constitute the second shifting element of the power take-off clutch made as a claw clutch. The radial gearteeth on the clutch side can also be integrated in the part of the clutch connected to the pressure plate thereof. The radial gearing of the driving disk can also be made in segments, this segmenting taking place for example by virtue of centering means on the driving disk.

The shifting elements of the power take-off clutch made as a claw clutch are designed and arranged relative to one another in such manner that the radial gearteeth of the annular segments and the radial gearteeth of the driving disk engage in one another with positive interlock when the power take-off clutch is in its coupled condition.

It is also provided that the power take-off clutch can be actuated by an actuator comprising an actuating piston which, to engage the power take-off clutch, can be pressed axially against the face of the driving disk of the second torsion fluctuation damper that has no teeth, which is arranged axially opposite the face provided with radial gearteeth; the at least one springy-elastic element of the second torsion fluctuation damper is designed to enable an axial displacement of the driving disk in the direction toward the radial teeth of the ring segments.

In this connection a preferred further development of the invention provides that the at least one springy-elastic element of the second torsion fluctuation damper, i.e. that of the torsion fluctuation damper of the power take-off clutch, is designed such that the actuating piston of the actuator of the power take-off clutch is pushed to its disengaged position by the springy-elastic element when the clutch is not actuated. Thanks to this design feature the actuating piston of the actuator of the power take-off clutch needs no separate restoring means in order to be moved from its actuating position to its non-actuating position.

In a further design of the invention it can be provided that the radial gearteeth on the annular segments and on the driving disk of the claw-type power take-off clutch have axially directed, straight tooth flanks. Thus, the tooth flanks are not mutually-repelling so that when torque is transmitted by the power take-off clutch, due to the friction forces on the tooth flanks the associated actuating piston has to exert no, or only comparatively small pressure forces to keep the power take-off clutch engaged.

According to another design of the invention it is provided that the radial gearteeth on the annular segments of the clutch housing and on the driving disk of the power take-off clutch have oblique tooth flanks. Thus, the tooth flanks are of mutually-repelling shape so that if the torque falls below a low or holding torque value determined by the tooth flank geometry and the friction forces, then due to the action of the springy-elastic element of the torsion fluctuation damper of the power take-off clutch and the absence of a holding force by the actuating piston, the driving disk is returned to its disengaged position.

For example, the drive assembly according to the invention comprises a transmission designed as a group transmission with a splitter group, a main group and optionally a range group. As a further development of this transmission it can be characterized in that the splitter and main groups are structurally combined, and the transmission comprises a transmission input shaft, a main transmission shaft and two countershafts arranged parallel thereto.

BRIEF DESCRIPTION OF THE DRAWINGS

The drive assembly according to the invention will be described in more detail below, with reference to an example embodiment. For this purpose the description is accompanied by a drawing with two figures, which show.

DETAILED DESCRIPTION OF THE PREFERRED EMBODIMENTS

Figure 1:
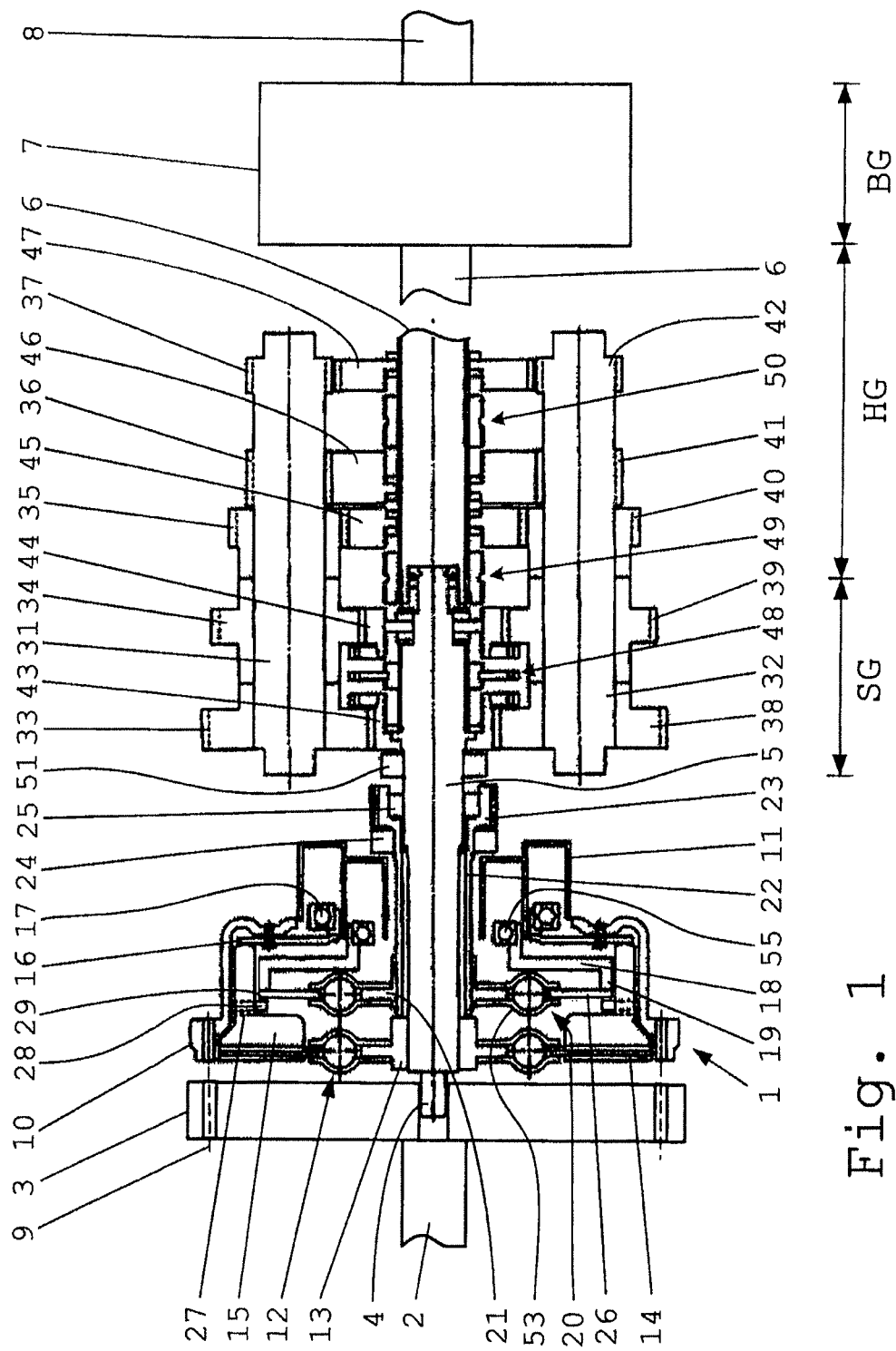
FIG. 1: A schematic partial longitudinally sectioned representation through a drive assembly of a motor vehicle with a clutch device and a transmission designed as a group transmission.

Thus, FIG. 1 shows a drive assembly for a motor vehicle, preferably for a utility vehicle, with a clutch device 1 made as a dual clutch Ia, Ib and with a stepped change-speed transmission made as a group transmission SG, HG, BG. The clutch housing 10 of the clutch device 1 is attached by screwbolts 9 to a flywheel 3 which is attached in a rotationally fixed manner to the crankshaft 2 of an internal combustion engine (not shown). The input sides of the two clutches 1a, 1b of the clutch device 1 can be driven by means of the clutch housing 10.

In this case the clutch device 1 comprises a starting and shifting clutch 1a in the form of a friction clutch and a power take-off clutch 1b in the form of an unsynchronized claw clutch. The output side of the starting and shifting clutch 1a is connected to the transmission input shaft 5, and the output side of the power take-off clutch 1b has a power take-off gearwheel 23, which drives a power take-off shaft arranged radially outside by means of a spur gear stage (not shown).

The group transmission comprises a splitter group with two input constants, whose loose gears 43 and 44 are mounted to rotate on the transmission input shaft 5 and which mesh with associated fixed gears 33, 34, 38, 39 on two countershafts 31, 32. The loose gears 43 and 44 can be connected rotationally fixed to the transmission input shaft 5 by means of a synchronized shifting device 48 with a two-sided action. At the end of the group transmission SG, HB, BG close to the drive motor the transmission input shaft 5 is supported radially by a roller bearing 51 on a transmission housing (not shown).

Furthermore, the group transmission has a main group HG which comprises three gear steps, with loose gears 45, 46, 47 arranged to rotate on a main transmission shaft 6 and respectively associated fixed gears 35, 36, 37; 40, 41, 42 on the two countershafts 31, 32. Respectively associated shifting elements 49, 50 are provided for connecting the loose gears 45, 46, 47 to the main transmission shaft 6 in a rotationally fixed manner.

Connected downstream from the main group HG is a range group BG, which is indicated here only schematically and is in the form of a simple planetary transmission 7. The input side of this range group BG is formed by the main transmission shaft 6, while a transmission output shaft 8 is provided as the output of the range group BG. The transmission output shaft 8 drives an axle transmission (not shown), which drives driveshafts leading to the vehicle's wheels.

Figure 2:
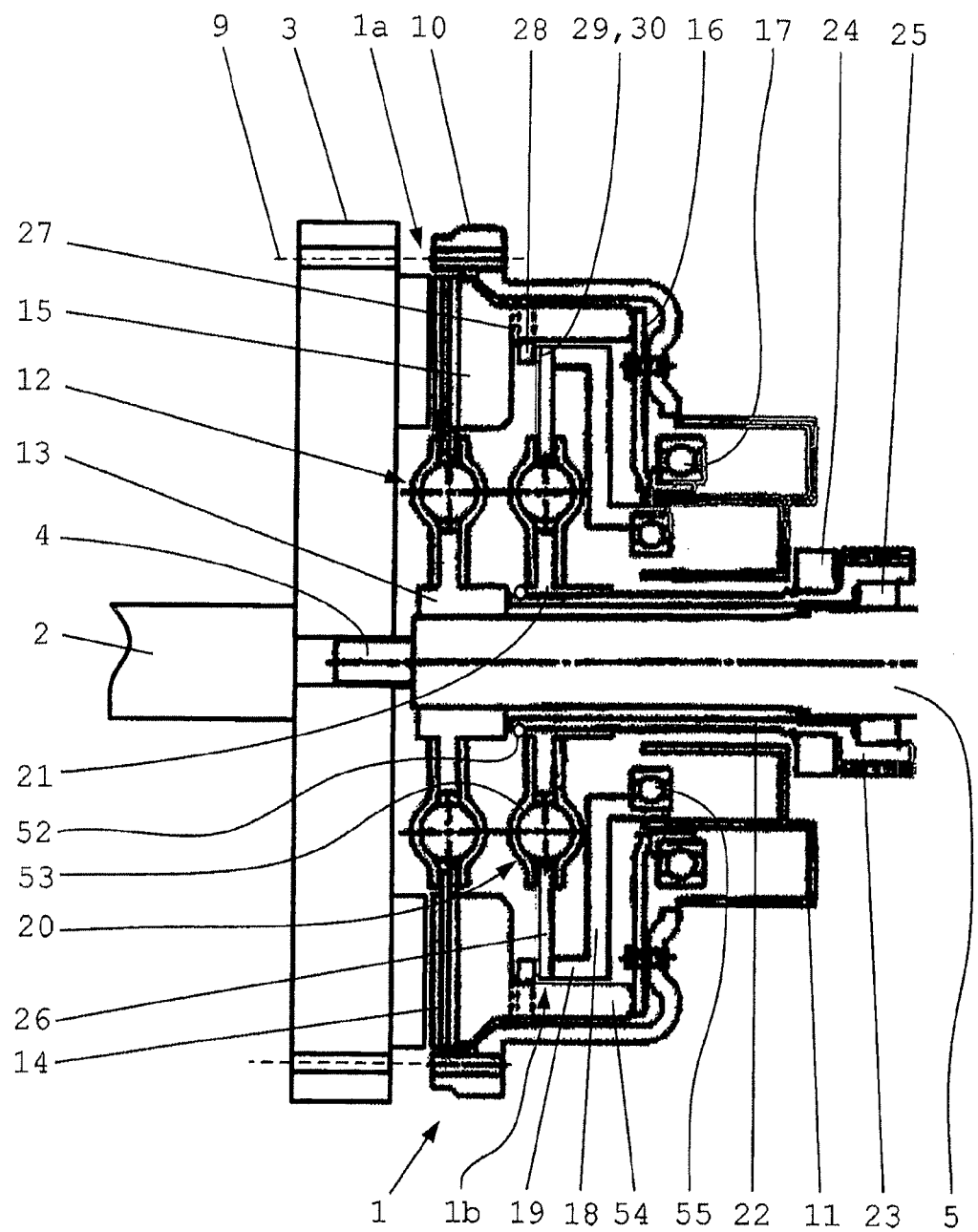
FIG. 2: The clutch device of FIG. 1, shown in an enlarged representation.

Of special importance for the drive assembly according to the invention is the clutch device 1 arranged upstream from the group transmission SG, HG, BG, since its design enables an axially particularly short drive assembly which also occupies little space radially. The special structure of this drive assembly can be seen particularly clearly in FIG. 2.

As already mentioned, the clutch device 1 made as a dual clutch can be driven on its input side by the crankshaft 2 of an internal combustion engine, which is connected via a flywheel 3 to the clutch housing 10 in a rotationally fixed manner. As FIG. 2 makes clear for this purpose the flywheel 3 also sits on an axial pin 4 of the transmission input shaft 5, and the latter extends all the way through the clutch device 1.

The starting and shifting clutch 1a made as a friction clutch is positioned immediately adjacent to the flywheel 3. It comprises radially on the inside a sleeve 13 connected in a rotationally fixed manner to the transmission input shaft 5, on which, radially in the middle, a first torsion fluctuation damper 12 is formed. In a manner known per se the spring means of this torsion fluctuation damper 12 are connected radially on the outside with a clutch disk 14 which, with its friction lining, can be pressed axially by a pressure plate 15 against the flywheel 3. For this purpose the pressure plate 15 is arranged radially inside the clutch housing 10 and guided axially on it. Provided as guiding aids are annular segments 28 that project from the clutch housing 10 radially inward with some play through radial openings 27 in the pressure plate 15, these also having further importance in co-operation with the power take-off clutch 1b.

The pressure plate 15 of the starting and shifting clutch 1a is constantly pressed by a cup spring 16 attached pivotably on the clutch housing 10, in the engaging direction toward the clutch disk 14, so that the starting and shifting clutch 1a is engaged when not actuated. To actuate or disengage the starting and shifting clutch 1a a pressure-medium-actuated actuator (not shown) is actuated, which moves the cup spring 16 by virtue of a release bearing to its disengaging position. The release bearing 17 is arranged in an actuator housing 11 common to both clutches 1a, 1b, and supported on it. Thus, a drive torque coming from the crankshaft 2 passes via the flywheel 3, the clutch housing 10, the cup spring 16, the pressure plate 15, the clutch disk 14, the first torsion fluctuation damper 12 and the sleeve 13, to the transmission input shaft 5.

As already mentioned, the clutch device 1 formed as a dual clutch also comprises a power take-off clutch in the form of a claw clutch, which is arranged axially immediately adjacent to the starting and shifting clutch 1a made as a friction clutch. This power take-off clutch 1b comprises radially on the inside a sleeve 21, radially in the middle of which is formed a second torsion fluctuation damper 20. The sleeve 21 of the power take-off clutch 1b is fixed in a rotationally fixed manner onto a hollow shaft 22, which is fitted by means of slide or roller bearings on the transmission input shaft 5. At its end remote from the drive motor the hollow shaft 22 carries the already-mentioned power take-off gearwheel 23, which is also supported radially and axially by a roller bearing 24 on a housing and by a roller bearing 25 on the transmission input shaft 5. Moreover, the figure shows a retaining ring 52 set into a ring groove in the hollow shaft 22, against which the sleeve 21 of the second torsion fluctuation damper 20 is supported axially.

The at least one springy-elastic element 53 of this second torsion fluctuation damper 20 is connected radially on the outside to a driving disk 26 and is designed such that with its radially outer end the driving disk 26 can be deflected in the direction toward the already-mentioned annular segments 28.

To produce such an axial deflection of the driving disk 26, a piston 18 of a pressure-medium-actuated actuator (not shown in detail) is provided, which can be pushed with an annular axial projection 19 against the face of the driving disk 26 of the power take-off clutch 1b that faces away from the starting and shifting clutch 1a.

For this purpose the piston 18 of the power take-off actuator is arranged in an area of the clutch device 1 which is covered both radially and axially by an axial extension 55 of the pressure plate 15 of the starting and shifting clutch 1a. Furthermore, the piston 18 is fitted into the common actuator housing 11, in which it can move axially by virtue of a release bearing 55, and is supported thereon.

To form the shifting element of an unsynchronized claw clutch, on its axial surface facing toward the annular segments 28 the driving disk 26 has teeth 30 whose length accordingly extends radially outward. In addition, each of the radially inward-extending annular segments 28 has at its end corresponding teeth 29. Thus, actuation of the piston 18 of the actuator of the power take-off clutch 1b results in an interlocked connection between the driving disk 26 and the annular segments 28 and ultimately therefore the clutch housing 10, so that a drive torque can be passed from the crankshaft 2, via the flywheel 3, the clutch housing 10, the annular segments 28, the driving disk 26, the sleeve 21 and the hollow shaft 22, to the power take-off gearwheel 23.

If the teeth of the tooth arrays 29, 30 at the ends of the annular segments 28 and on the driving disk 26 have straight tooth flanks, i.e. tooth flanks which are essentially directed axially, then when a sufficiently large torque is being transmitted the power take-off clutch 16 acts in a self-locking manner, and this even if the actuating force on the piston 18 of the power take-off actuator has been almost completely removed.

In contrast, if the tooth arrays 29, 30 at the ends of the annular segments 28 and on the driving disk 26 have teeth with inclined tooth flanks directed away from the longitudinal central axis of the drive assembly, then when a torque is being transmitted the power take-off clutch 1b acts in a self-separating manner so that to keep it engaged, an actuating force has to be exerted continuously on the piston 18 of the power take-off actuator. With this latter embodiment, however, it is an advantage that if the actuating force is removed the power take-off clutch 1b disengages automatically, i.e. solely by virtue of the restoring force of the spring means 23 of the second torsion fluctuation damper, and the power take-off is thereby disconnected. Furthermore, such a power take-off clutch 1b can even be disengaged during the transmission of a high torque by the power take-off without a large actuating force, and the power take-off thereby disconnected. For this, the arrangement of the shifting elements (radial teeth 29, 30) on a large effective diameter is particularly advantageous.

Besides the radial orientation of the radial teeth 29, 30 on the annular segments 28 and on the driving disk 26 as explained, in another embodiment they can also be formed as axial tooth arrays.

If the restoring force of the springy-elastic element 53 of the second torsion fluctuation damper 20 on the driving disk 26 of the power take-off clutch 1b is not sufficient to return the driving disk to its non-actuating position in case of need, then as simply designed means for that purpose at least one more restoring spring can be provided.

It has been made clear that by arranging the power take-off clutch outside the transmission housing, i.e. in the dry space or clutch housing (clutch cover 10) of the starting and shifting clutch 1a, no actuators in the transmission are needed in order to engage or disengage the power take-off. This too advantageously shortens the drive-train and reduces the complexity of the transmission SG, HG, BG.

Furthermore, with the clutch assembly 1 proposed, the power take-off clutch 1b can be combined as a module with an already existing starting and shifting clutch 1a, with the power take-off clutch 1b integrated on one side in the clutch housing. In addition the proposed clutch assembly 1 with its starting and shifting clutch 1a and power take-off clutch 1b can be derived as a design from an already existing dual clutch.

Indexes

1 Clutch device
1a Starting and shifting clutch
1b Power take-off clutch
2 Crankshaft
3 Flywheel
4 Pin of the transmission input shaft
5 Transmission input shaft
6 Main transmission shaft
7 Planetary transmission
8 Transmission output shaft
9 Screw-bolt joint
10 Clutch cover
11 Actuator housing
12 First torsion fluctuation damper
13 Sleeve of the first torsion fluctuation damper
14 Clutch disk of the starting and shifting clutch
15 Pressure plate of the Starting and shifting clutch
16 Cup spring of the actuator of the starting and shifting clutch
17 Release bearing of the starting and shifting clutch
18 Piston of the actuator of the starting and shifting clutch
19 Axial projection of the piston 18
20 Second torsion fluctuation damper
21 Sleeve of the second torsion fluctuation damper
22 Hollow shaft on the power take-off gearwheel
23 Power take-off gearwheel
24 First roller bearing on the power take-off gearwheel
25 Second roller bearing on the power take-off gearwheel
26 Driver disk on the second torsion fluctuation damper
27 Radial opening in the pressure plate of the starting and shifting clutch
28 Annular segment of the claw clutch
29 Radial teeth on the annular segment 28
30 Radial teeth on the driver disk 26
31 First countershaft
32 Second countershaft
33 Fixed gearwheel on the first countershaft
34 Fixed gearwheel on the first countershaft
35 Fixed gearwheel on the first countershaft
36 Fixed gearwheel on the first countershaft
37 Fixed gearwheel on the first countershaft
38 Fixed gearwheel on the second countershaft
39 Fixed gearwheel on the second countershaft
40 Fixed gearwheel on the second countershaft
41 Fixed gearwheel on the second countershaft
42 Fixed gearwheel on the second countershaft
43 Loose gearwheel on the transmission input shaft
44 Loose gearwheel on the transmission input shaft
45 Loose gearwheel on the main transmission shaft
46 Loose gearwheel on the main transmission shaft
47 Loose gearwheel on the main transmission shaft
48 Shifting device
49 Shifting device
50 Shifting device
51 Roller bearing
52 Retaining ring
53 Springy-elastic element on the second torsion fluctuation damper
54 Axial extension of the pressure plate 15
55 Release bearing on the actuator of the power takeoff clutch
SG Splitter transmission
HG Main transmission
BG Range transmission

The invention claimed is:

1. A drive assembly for a motor vehicle with a clutch device (1) on an input side, the drive assembly comprising:
a transmission having a transmission input shaft (5), at least one other transmission shaft (6, 31, 32) and a transmission output shaft (8),
loose gearwheels and fixed gearwheels being arranged on transmission shafts (5, 6, 31, 32) and forming transmission gears,
shifting devices (48, 49, 50) for coupling the loose gearwheels (43, 44, 45, 46, 47) to at least one of the transmission shafts (5, 6) in a rotationally fixed manner,
a power take-off gearwheel (23) being drivable from an input side of the clutch device (1), and
the clutch device comprises a power take-off clutch (1b) the power take off clutch is actuated by a first actuator for at least one of engaging and disengaging the power take-off gearwheel (23) in torque flow,
the power take-off clutch (1b) being arranged axially adjacent to a starting and shifting clutch (1a), the starting and shifting clutch is actuated by a second actuator for at least one of engaging and disengaging the transmission input shaft in torque flow, the clutch device (1) being a dual clutch which comprises the starting and shifting clutch (1a), the power take-off clutch (1b) and the first and the second actuators respectively associated with the starting and shifting clutch and the power take-off clutch (1a, 1b), and the power take-off clutch and the first actuator are radially and axialluested within the starting and shifting clutch, the starting and shifting clutch (1a) is a friction clutch and the power take-off clutch (1b) is a claw clutch, the starting and shifting clutch and the power take-off clutch (1a, 1b) have a common clutch cover (10) and a common actuator housing (11), and a coupling means (28, 29, 30) of the power take-off clutch (1b) is arranged on a radially outer area of the clutch cover (10).

2. The drive assembly according to claim 1, wherein the power take-off clutch (1b) is arranged radially and axially within a structural space of an axial extension (54) of a pressure plate (15) of the starting and shifting clutch (1a).

3. The drive assembly according to claim 1, wherein the starting and shifting clutch (1a) is connected on an input side to the clutch cover (10) and on an output side to the transmission input shaft (5).

4. The drive assembly according to claim 1, wherein the power take-off clutch (1b) is connected, on an input side, to the clutch cover (10) and, on an output side, to a hollow shaft (22), the hollow shaft (22) is mounted to rotate on the transmission input shaft (5), and the power take-off gearwheel (23) is either fixed to or formed on the hollow shaft (22).

5. The drive assembly according to claim 1, wherein the starting and shifting clutch (1a) and the power take-off clutch (1b) each comprise a respective torsion fluctuation damper (12, 20).

6. The drive assembly according to claim 5, wherein the torsion fluctuation damper (20) of the power take-off clutch (1b) is connected to a sleeve (21) arranged radially on an inside which is connected, in a rotationally fixed manner, to the hollow shaft (22), the torsion fluctuation damper (20) comprises at least one springy-elastic element (53), and the torsion fluctuation damper (20) is connected radially, on an outside, to a driving disk (26) which has teeth (30) in an area of its radial face.

7. The drive assembly according to claim 1, wherein the starting and shifting clutch (1a) comprises a cup spring (16) which has radially inner and outer edges and is pivotably fixed to the clutch cover (10) at a pivot point of the cup spring that is radially located between the inner and outer edges,. and the cup spring is actuated by a control element so as to pivot about the pivot point.

8. The drive assembly according to claim 7, wherein the starting and shifting clutch (1a) comprises a pressure plate (15) which, in a non-actuated condition of the starting and shifting clutch (1a), is acted upon with an engaging force by the radially outer edge of the cup spring (16), and the pressure plate (15) has radially aligned through holes (27), annular segments (28) project radially inward with play through the through holes in the pressure plate.

9. The drive assembly according to claim 8, wherein the annular segments (28) are connected in a rotationally fixed manner to a radially inner side of the clutch cover (10) and extend radially inward therefrom.

10. The drive assembly according to claim 8, wherein the annular segments (28) have a face on an end that is remote from the clutch cover, the face of the annular segments comprises radial teeth (29) that extend from the face of the annular segments in an axial direction toward the power take-off clutch (1b).

11. The drive assembly according to claim 10, wherein the radial teeth (29, 30) of the annular segments (28) and radial teeth fixed at an outer perimeter of the driving disk (26), of the power take-off clutch (1b) mate and engage with one another.

12. The drive assembly according to claim 11, wherein the starting and shift clutch comprises clutch disk that is radially larger than the driving disk of the power take-off clutch, and the radial teeth (29, 30) on the annular segments (28) and on the driving disk (26) have axially directed, straight tooth flanks.

13. The drive assembly according to claim 11, wherein the radial teeth (29, 30) on the annular segments (28) and on the driving disk (26) have inclined tooth flanks.

14. The drive assembly according to claim 1, wherein the transmission comprises a group transmission including a splitter group (SG) and a main group (HG), the power take-off clutch comprises a driving disk and the starting and shifting clutch comprises clutch disk, the clutch disk is radially larger than the driving disk.

15. The drive assembly according to claim 14, wherein the splitter group (SG) and the main group (HG) are structurally combined and comprise a transmission input shaft (5), a main transmission shaft (6) and two countershafts (31, 32) arranged parallel thereto.

16. The drive assembly according to claim 1, wherein the transmission comprises a group transmission including a splitter group (SG), a main group (HG) and a range group (BG).

17. The drive assembly according to claim 16, wherein the splitter group (SG) and the main group (HG) are structurally combined and comprise a transmission input shaft (5), a main transmission shaft (6) and two countershafts (31, 32) arranged parallel thereto.

18. A drive assembly for a motor vehicle with a clutch device (1) on an input side the drive assembly comprising:
a transmission having a transmission input shaft (5), at least one other transmission shaft (6, 31, 32) and a transmission output shaft (8), loose gearwheels and fixed gearwheels being arranged on transmission shafts (5, 6, 31, 32) and forming transmission gears, shifting devices (48, 49, 50) for coupling the loose gearwheels 43, 44 45, 46, 47) to at least one of the transmission shafts(5, 6) in a rotationally fixed manner, a power take-off gearwheel (23) being drivable from an input side of the clutch device (1), a power take-off clutch (1b) for engaging the power take-off gearwheel (23) in torque flow the power take-off clutch (1b) being arranged axially adjacent to a starting and shifting clutch (1a), the clutch device (1) being a dual clutch which comprises the starting and shifting clutch (1a), the power take-off clutch (1b) and two clutch actuators respectively associated with the starting and shifting clutch and the power take-off clutch (1a,1b)

the starting and shifting clutch (1a) is a friction clutch and the power take-off clutch (1b) is a claw clutch, the starting and shifting clutch and the power take-off clutch (1a, 1b) have a common clutch cover (10) and a common actuator housing (11), a coupling means (28, 29, 30) of the power take-off clutch (1b) is arranged on a radially outside area of the clutch cover (10), the starting and shifting clutch (1*a*) comprises a cup spring (16) which is fixed to the clutch cover (10) and is actuated by a control element, the starting and shifting clutch (1*a*) comprises a pressure plate (15) which, in a non-actuated condition of the starting and shifting clutch (1*a*), is acted upon with an engaging force by the cup (16), and the pressure plate (15) has radial openings (27),through which annular segments (28) project radially inward with play, the annular segments (28) have radial teeth (29) on their end face directed axially toward the power take-off clutch (1*b*), the radial teeth (29, 30) of the annular segments (28) and the driving disk (26), in a of coupled condition of the power take-off clutch,(1*b*) engage with one another, and the power take-off clutch (*b*) comprises an actuating piston (18) of the associated actuator which is pressed axially, against a tooth-free face of the driving disk (26), to engage the power take-off clutch (1*b*), and the at least one springy-elastic element (53) of the second torsion fluctuation damper (20) enables axial deflection of the driving disk (26).

19. The drive assembly according to claim 18, wherein the at least one springy-elastic element (53) of the second torsion fluctuation damper (20) is designed such that, in a non-actuated condition the actuating piston (18), of the actuator of the power take-off clutch (1*b*), is pushed by the springy-elastic element (53) to an opening position.

\* \* \* \* \*